(12) United States Patent
Miller, IV et al.

(10) Patent No.: US 11,692,309 B2
(45) Date of Patent: Jul. 4, 2023

(54) SYSTEM AND METHOD FOR MILL EFFLUENT BIOLOGICAL OXYGEN DEMAND (BOD) REDUCTION

(71) Applicant: First Quality Tissue, LLC, Great Neck, NY (US)

(72) Inventors: Byrd Tyler Miller, IV, Easley, SC (US); James E. Sealey, Belton, SC (US); James E. Bradbury, Anderson, SC (US)

(73) Assignee: FIRST QUALITY TISSUE, LLC, Greak Neck, NY (US)

(*) Notice: Subject to any disclaimer, the term of this patent is extended or adjusted under 35 U.S.C. 154(b) by 0 days.

(21) Appl. No.: 16/775,419

(22) Filed: Jan. 29, 2020

(65) Prior Publication Data

US 2020/0199817 A1    Jun. 25, 2020

Related U.S. Application Data

(63) Continuation of application No. 15/937,426, filed on Mar. 27, 2018, now Pat. No. 10,584,443.

(51) Int. Cl.
*D21C 5/02* (2006.01)
*D21H 17/00* (2006.01)
(Continued)

(52) U.S. Cl.
CPC .............. *D21C 5/02* (2013.01); *D21H 11/14* (2013.01); *D21H 15/06* (2013.01); *D21H 17/71* (2013.01)

(58) Field of Classification Search
None
See application file for complete search history.

(56) References Cited

U.S. PATENT DOCUMENTS 2,777,367 A * 1/1957 Ednell .................. D21J 7/00
162/229
6,494,704 B1 * 12/2002 Andersen ............ B29C 37/0007
425/258
(Continued)

FOREIGN PATENT DOCUMENTS

CN          101550665 A      10/2009
JP           07-069701 A       3/1995
WO      WO 90/111978 A1 *  10/1990

OTHER PUBLICATIONS

Smook, Handbook of Pulp & Paper Terminology, Angus Wilde Publications Inc., 1990, pp. 90,94. (Year: 1990).*
(Continued)

*Primary Examiner* — Dennis R Cordray
(74) *Attorney, Agent, or Firm* — Amster, Rothstein & Ebenstein LLP

(57) ABSTRACT

A system and method of forming a molded pulp product that involves separately collecting, from a paper-making process, waste water containing short fibers at a first fiber consistency, waste water as dilution water containing fibers at a second fiber consistency that is lower than the first fiber consistency, and water containing long fibers, the long fibers having a length that is greater than a length of the short fibers, blending the waste water containing short fibers and the water containing long fibers to obtain a pulp slurry, and molding the pulp slurry into a molded pulp product at a pulp molding machine. In an embodiment, filtrate removed during the molding of the molded pulp product has a BOD measurement that is 95% less than a BOD measurement of the pulp slurry, where the BOD measurements are obtained using the EPA 405.1, SM5210B Test Method.

18 Claims, 1 Drawing Sheet

(51) Int. Cl.
  *D21H 11/14*    (2006.01)
  *D21H 15/06*    (2006.01)

(56)         References Cited

U.S. PATENT DOCUMENTS 6,521,085   B2 *  2/2003  Kumamoto .......... B65D 1/0207
                                                        162/130
  2007/0227680 A1 * 10/2007 Kim .................... B65D 81/025
                                                        162/218
  2017/0328002 A1   11/2017 Wyatt et al.
  2018/0361394 A1   12/2018 Banks et al.

OTHER PUBLICATIONS

Machine translation of JP07-069701, The European Patent Office,[online], [retrieved on Aug. 10, 2019]. Retrieved from the Internet: <URL: https://worldwide.espacenet.com/?locale=EN_ep> (Year: 2019).
Machine translation of CN101550665, The European Patent Office[online], [retrieved on Aug. 9, 2019]. Retrieved from the Internet: <URL: https://worldwide.espacenet.com/?locale=EN_ep> (Year: 2019).

* cited by examiner

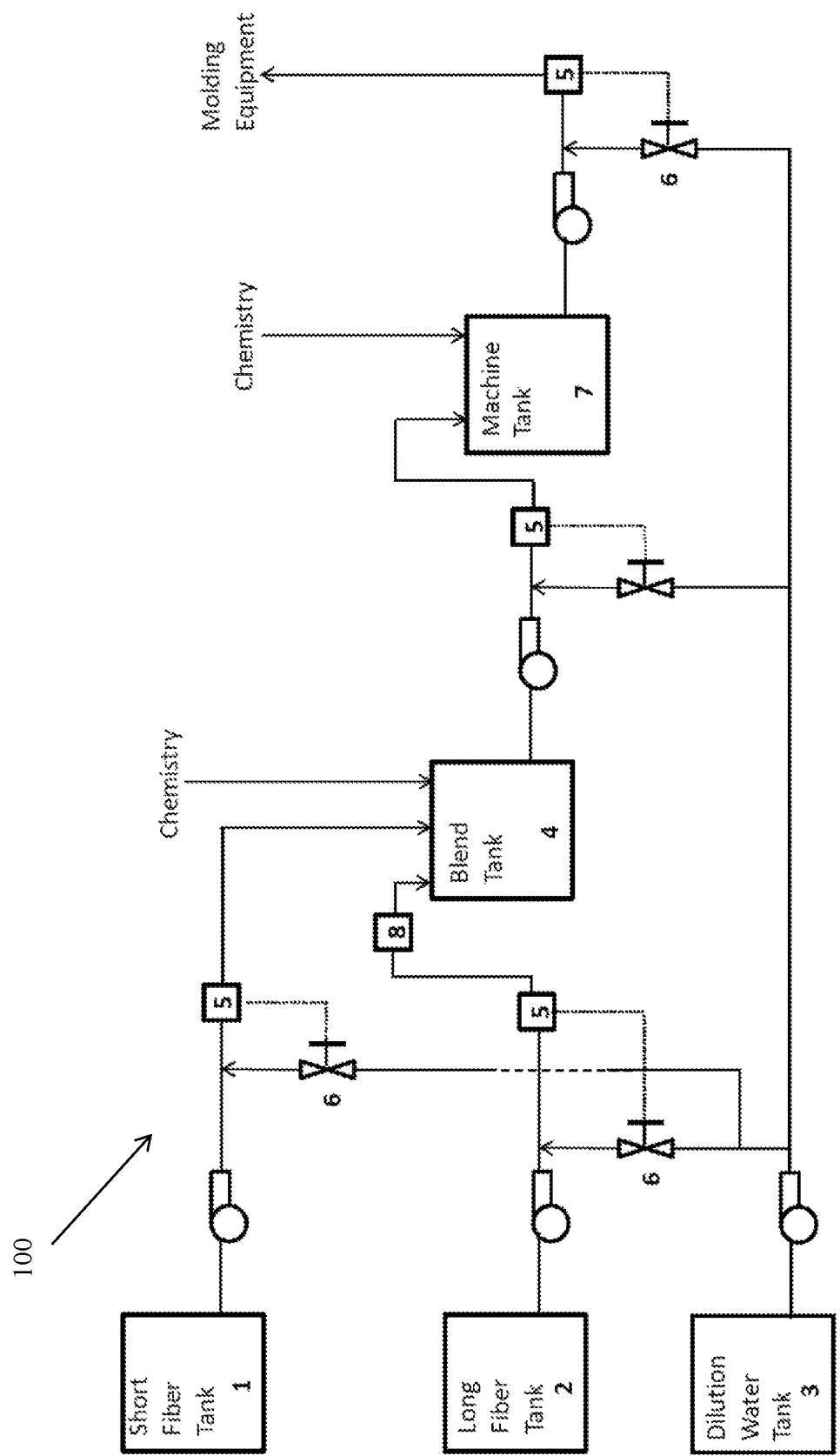

SYSTEM AND METHOD FOR MILL EFFLUENT BIOLOGICAL OXYGEN DEMAND (BOD) REDUCTION

RELATED APPLICATIONS

This application is a continuation of U.S. patent application Ser. No. 15/937,426, entitled SYSTEM AND METHOD FOR MILL EFFLUENT BIOLOGICAL OXYGEN DEMAND (BOD) REDUCTION and filed Mar. 27, 2018, the contents of which are incorporated herein by reference in their entirety.

FIELD OF THE INVENTION

The present invention relates to systems and methods for reducing paper mill effluent biological oxygen demand (BOD), and in particular to systems and methods for reducing paper mill BOD that result in production of sellable molded fiber products.

BACKGROUND

For many paper mills, the main fiber source to waste water treatment comes from rejects of Dissolved Air Flotation (DAF) systems located on the paper machines. DAF systems are primarily used on paper machines to filter out very short fibers and fines present in the pulp sources that are not suitable for use on the paper machines. For ultra-premium tissue and towel products, incorporation of these fines and short fibers into the product can densify the sheet which reduces the flexibility and perceived softness of the product, which is undesirable. To remove these short fibers and fines, a portion of the reused process water is continually pumped to the DAF for fiber removal. The process water is re-used to dilute the incoming pulp to a proper consistency for use on the paper machine. Specifically, the process water drains through the paper machine fabrics, and a portion of this process water is then processed at the DAF to remove the fines and short fibers contained in the process water. After processing at the DAF, the water is reused again in a continuous loop to dilute more pulp to be used on the paper machine.

In many paper mills, the fibers removed from the DAF are sent to the process sewer which flows to waste water treatment. These fibers make up a large percentage of the biological oxygen demand (BOD) which must be reduced to a permissible level before the water can be discharged back into the environment. At waste water treatment, there are many ways to remove or degrade the fibers. Many treatment plants can remove a portion of the fibers using a clarifier, screw press, or large DAF system. These fibers are then most often sent to a landfill, or dewatered and burned at the plant to produce energy. With much of the fiber now removed, the remainder of the fibers and other BOD contributing components, such as chemicals, are degraded using microbes in Aeration Sedimentation Ponds or similar types of processes. Once treatment is complete, and the BOD level is at the permitted level, the water can be discharged back to the environment.

Waste water treatment costs can be significant and also restrictive to paper mill production if the water cannot be treated to meet environmental standards including BOD levels. There exists the need to reduce the costs of waste water treatment as well as improve the efficiency of waste water treatment to ensure profitability and operability within a paper mill.

SUMMARY OF THE INVENTION

An object of this invention is to provide a process for improving the efficiency and reducing the costs of paper mill waste water treatment. In exemplary embodiments, the process involves collecting fiber rich waste water streams, including the reject waste water stream from the paper machine DAF, prior to the stream entering the process sewers. The collected fiber rich water is then utilized on molded cellulose equipment to filter out the fibers and other BOD components, such as chemicals bonded to the fibers. The fibers filtered from these water sources can be molded into various shapes, depending on the mold, which are then dewatered and dried to produce usable finished molded fiber products such as egg cartons, plates, cups, bowls, trays, take-home boxes, or various packaging for products such as electronics.

Exemplary embodiments of the present invention relate to methods for reducing paper mill effluent biological oxygen demand (BOD) by collection of fiber rich waste water streams which are filtered using molded fiber equipment to remove the fiber and create sellable molded fiber products.

A method of forming a molded pulp product according to an exemplary embodiment comprises: separately collecting, from a paper-making process, waste water containing short fibers at a first fiber consistency, waste water as dilution water containing fibers at a second fiber consistency that is lower than the first fiber consistency, and water containing long fibers, the long fibers having a length that is greater than a length of the short fibers; blending the waste water containing short fibers and the water containing long fibers to obtain a pulp slurry; and molding the pulp slurry into a molded pulp product at a pulp molding machine, wherein filtrate removed during the molding of the molded pulp product has a BOD measurement that is 95% less than a BOD measurement of the pulp slurry, wherein the BOD measurements are obtained using the EPA 405.1, SM5210B Test Method.

In an exemplary embodiment, the waste water containing short fibers has a fiber consistency in the range of 1.0% and 5.0%.

In an exemplary embodiment, the dilution water has a fiber consistency below 0.5%.

In an exemplary embodiment, the long fibers have a length greater than 1.5 mm Lw as measured using a Fiber Quality Analyzer.

In an exemplary embodiment, the step of blending comprises sending the waste water containing short fibers and the water containing long fibers to a blend tank.

In an exemplary embodiment, the method further comprises, prior to the blending step, the step of controlling fiber consistency of the long fibers and the short fibers to a range of 0.75% to 2.25% using the dilution water.

In an exemplary embodiment, the method further comprises the step of mixing the pulp slurry with at least one of sizing control agents, strength control agents, microbe control agents, brightness control agents or whiteness control agents.

In an exemplary embodiment, the method further comprises, prior to the molding step, the step of controlling fiber consistency of the pulp slurry to be within a range of 0.5% to 0.3% using the dilution water.

In an exemplary embodiment, the waste water containing short fibers is sourced from one or more save-alls of a paper-making machine used in the paper-making process.

In an exemplary embodiment, one or more save-alls comprise at least one of a dissolved air flotation system, a disc filter or a clarifier.

In an exemplary embodiment, the method further comprises the step of refining the long fiber.

In an exemplary embodiment, the short fibers have a length that is less than 1.0 Lw as measured using a Fiber Quality Analyzer.

In an exemplary embodiment, the long fibers comprise fibers selected from the group consisting of: softwood, kenaf, elephant grass, esparto grass, sisal, abaca, jute, hemp, cotton linters, rayon fibers, modified rayon fibers, renewable polymeric fibers, water-based polyvinyl alcohol (PVA) fibers, synthetic fiber, semisynthetic fibers, repulped paper mill waste fiber and combinations thereof.

In an exemplary embodiment, the long fibers are re-pulped paper mill waste fibers.

A method of forming a molded pulp product according to an exemplary embodiment of the invention comprises: separately collecting, from a paper-making process, waste water containing short fibers at a first fiber consistency, waste water as dilution water containing fibers at a second fiber consistency that is lower than the first fiber consistency, and water containing long fibers, the long fibers having a length that is greater than a length of the short fibers; blending the waste water containing short fibers and the water containing long fibers to obtain a pulp slurry; and molding the pulp slurry into a molded pulp product at a pulp molding machine.

A method of forming a molded pulp product according to an exemplary embodiment of the invention comprises: separately collecting, from a paper-making process, waste water containing short fibers at a first fiber consistency, fresh water as dilution water containing fibers at a second fiber consistency that is lower than the first fiber consistency, and water containing long fibers, the long fibers having a length that is greater than a length of the short fibers; blending the waste water containing short fibers and the water containing long fibers to obtain a pulp slurry; and molding the pulp slurry into a molded pulp product at a pulp molding machine, wherein filtrate removed during the molding of the molded pulp product has a BOD measurement that is 95% less than a BOD measurement of the pulp slurry, wherein the BOD measurements are obtained using the EPA 405.1, SM5210B Test Method.

A method of forming a molded pulp product according to an exemplary embodiment comprises: separately collecting, from a paper-making process, waste water containing short fibers at a first fiber consistency, fresh water as dilution water containing fibers at a second fiber consistency that is lower than the first fiber consistency, and water containing long fibers, the long fibers having a length that is greater than a length of the short fibers; blending the waste water containing short fibers and the water containing long fibers to obtain a pulp slurry; and molding the pulp slurry into a molded pulp product at a pulp molding machine.

A system for forming a molded pulp product according to an exemplary embodiment of the present invention comprises: a first tank configured to collect, from a paper-making process, waste water containing short fibers at a first fiber consistency; a second tank configured to collect dilution water containing fibers at a second fiber consistency that is lower than the first fiber consistency; a third tank configured to collect, from the paper-making process, water containing long fibers, the long fibers having a length that is greater than a length of the short fibers; a blend tank that blends the waste water containing short fibers and the water containing long fibers with the dilution water to obtain a pulp slurry; and a pulp molding machine that molds the pulp slurry into a molded pulp product.

These and other features and advantages of the present invention will be presented in more detail in the following detailed description and the accompanying FIGURES which illustrate by way of example principles of the invention.

DESCRIPTION OF THE DRAWINGS

The features and advantages of exemplary embodiments of the present invention will be more fully understood with reference to the following, detailed description when taken in conjunction with the accompanying FIGURES, wherein:

FIG. 1 a block diagram of a system for making a molded fiber product according to an exemplary embodiment of the present invention.

DETAILED DESCRIPTION

Molded fiber products have been in existence for decades, and there are a variety of known molded fiber apparatuses, systems, and methods for producing molded fiber products. The fiber sources used to make molded products include wood pulp from virgin or recycled sources, biomass from plant origin (grasses, sugar cane, bamboo, rice, barley, tomato plant leaves, palm oil plants, flax, hemp, ramie, cotton, kenaf, jute, bannano, wheat, reed grass, maize, sorghum, rape seed, etc), synthetic fibers, semisynthetic fibers, or mixtures thereof (for example, see US Patent Publication Nos. 2016/0257486 A1, US20160137350A1, and US20140251853A1, and PCT Publication No. WO2016167648A1). However, none of the conventional processes involve the use of fibers sourced from paper machine waste water.

Fiber rich waste water streams from a paper mill are continuously collected prior to entrance into the process sewers which flow to a waste water treatment facility. The main fiber rich stream to be collected is the waste water stream from the paper machine process water clarification equipment. The most prominent piece of equipment used to remove short fibers and fines from the paper machine process water system is the DAF system. Other filtering systems, broadly referred to as "save-alls", include but are not limited to disc filters and clarifiers. Other possible fiber rich sources can include seal pit water from vacuum sources on the paper machine such as dewatering boxes or uhle boxes, discharge water from paper machine dust collection equipment, shower water used to clean fibers from the paper machine fabrics, or simply extra process water.

FIG. 1 is a block diagram of a system, generally designated by reference number 100, for making a molded fiber product according to an exemplary embodiment of the present invention. The system 100 includes a Short Fiber Tank 1, a Long Fiber Tank 2, a Dilution Water Tank 3, a Blend Tank 4 and a Machine Tank 7.

Waste water streams from paper machine save-all devices such as the DAF, disc filter, or clarifier are collected in the common Short Fiber Feed Tank 1. For the purposes of the present description, the term "short fiber" refers to fibers with a length weighted fiber length (Lw) less than 1.0 mm as measured using a Fiber Quality Analyzer. The waste water collected in the Short Fiber Tank contains short fibers and preferably has a fiber consistency between 1.0% and 5.0%. The remaining waste water streams with fiber consistencies below 0.5% are collected in the separate Dilution Water Tank 3. Alternatively, the dilution water may be fresh water from sources that include but are not limited to lake, river, or well water that may be treated locally at the paper facility to remove particulates and microbes or municipal drinking water.

The Long Fiber Tank 2 holds long fibers. For the purposes of the present description, the term "long fiber" refers to fibers with an Lw greater than 1.5 mm as measured using a Fiber Quality Analyzer. The long fibers can be any type of fiber having the requisite length, including but not limited to: softwood, kenaf, elephant grass, esparto grass, sisal, abaca, jute, hemp, cotton linters, rayon fibers, modified rayon fibers, renewable polymeric fibers, water-based polyvinyl alcohol (PVA) fibers, synthetic fiber, semisynthetic fibers, repulped paper mill waste fiber, or combinations thereof. The paper mill waste can include but is not limited to the trim waste from a converting process or the paper machines, waste paper created during a sheet break occurring on the paper machine, or off quality paper from the converting process or the paper machine.

Fiber from the Short Fiber Tank 1 is pumped to the Blend Tank 4 along with a suitable amount of long fiber from the Long Fiber Tank to control strength of the finished molded fiber product. Longer fibers are better at building strength compared to shorter fibers as they have larger surface area for fiber to fiber hydrogen bonding and additional surface area for chemical strength aids to react. The consistency of both the long fiber and short fiber is controlled to approximately 1.5% using consistency measurement devices and controllers 5. The controllers 5 control automatic valves 6 to ratio the appropriate amount of dilution water from the Dilution Water Tank 3 as the fibers are pumped to the Blend Tank. As the long fiber is pumped to the Blend tank, it can be refined mechanically such as by a disc or conical refiner 8 to enhance fiber to fiber bonding through fiber fibrillation and aid in finished product strength control. Refining can also be used to control the drainage speed of the fiber slurry as it drains through the mold on the molding machine. Drainage speed is an important parameter to control for maximizing productivity across the molding equipment.

In the Blend Tank 4, the pulp from the two sources is agitated and mixed with any chemistry needed for property generation of the finished molded fiber product. Examples of chemistry include Alkylketene dimer or Alkenyl Succinic Anhydride for sizing control, starch for strength control, biocide for microbe control, and peroxide and/or dyes for brightness and whiteness control. After mixing, the pulp slurry is pumped to the Machine Tank 7 while being controlled to a consistency of 0.75% using water from the Dilution Water Tank 3. In the Machine Tank 7, the slurry is agitated with additional chemistry if desired before being pumped to the equipment that molds the fiber and dries it into a finished molded fiber product. As the fiber slurry is pumped to the molding equipment, it is controlled to a consistency between 0.5% to 0.3%, for optimal and even fiber formation on the molding equipment. Water removed from the molding equipment can be sent to the process sewer which flows to waste water treatment, or can be reused by sending the water back to the Dilution Water Tank 3. Vacuum and pressing performed during the molding process results in retention of the fiber and attached chemistry within the molded product. Thus, the water that is removed during the molding process typically has had greater than 95% of the BOD removed. For maximum BOD removal, the water removed from the mold should be sent to the process sewer so the more BOD rich water from the Dilution Water Tank 3 can be processed and cleaned. The type of molding process utilized includes but is not limited to Type 1 (Thick or Heavy Walled), Type 2 (Transfer Molded), Type 3 (Thermoformed or Cure in the Mold) or Type 4 (Processed) Technology as described by the International Molded Fiber Association (International Molded Fiber Association (IMFA), 355 Lexington Avenue, Floor 15, New York, N.Y. 10017 USA).

To maximize BOD reduction in the paper mill waste water, use of the long fiber is preferably minimized while maximizing the use of the short fiber which is obtained from sources that would otherwise be discharged to the mill waste water system. It is also important to collect the short fibers from the waste water streams before they enter the process sewers to prevent any contamination of the fibers. It is essential to keep the fibers clean if molded products will come into contact with food and comply with the FDA standards 176.170 and 176.180.

The following discussion describes the techniques used to determine the values for basis weight, length weighted fiber length (Lw), burst resistance strength, and Whiteness Index (including l, a, b) in connection with the various exemplary embodiments of the present invention.

Fiber Length Measurements Using FQA

The length weighted fiber length measurements were taken using a Fiber Quality Analyzer (Product Code LDA02) purchased from OpTest Equipment located at 900 Tupper, Hawkesbury, Ontario, Canada K6A 3S3. Installation, connections, startup procedure, initial system check, and performance checks were completed using the LDA02 FQA Operation Manual.

The instrument operating principles are as follows: The instrument uses an optics box composed of a flow cell, light source, circular polarizing filters, and a CCD Camera to measure the length, width, coarseness, kink, and curl of fiber in a dilute slurry that pass through the optics box. Diluted fibers immersed in clean water enter the center port at the bottom of the flow cell. The fibers entering the center port pass through a thin planar channel. This channel helps to gently orient the fiber two-dimensionally so that the fiber is fully viewed by the camera. High quality water enters the two side ports at the bottom of the flow cells which sandwich the thin plane containing the fiber. This helps to orient the fiber and protect the flow cell from contaminants. The far-red spectrum light source is located on the left hand side of the flow cell. The far-red spectrum light passes through a circular polarizing filter. The polarized light then passes through the window of the flow cell. If the polarized light strikes a fiber, a phase shift will occur which will allot the light to pass through the second circular polarizing filter and reach the camera located on the right hand side of the flow cell. Only higher organized crystalline structure are able to cause a phase shift in circular polarized light. Therefore, the instrument will not detect inks, pitch, or scale which would affect results. The CCD Camera pixels are zero cross talk, zero defect, with 256 grey levels, and a pixel resolution of 7 micrometers for width and 14 micrometers for length. The software on the instrument uses the images from the camera to then perform the aforementioned measurements of the fibers.

To measure the length weighted fiber length (Lw) of a pulp slurry, the "Sample Identification" procedure in the LDA02 FQA Operation Manual was followed before the sample was measured to properly identify and save the fiber length data in the instrument for later retrieval. Next, the "Test Procedure" steps in the LDA02 FQA Operation Manual were followed (place the sample in the beaker holder, under "Predefined Settings" select TAPPI T271 and then select "Start"). At this stage, the instrument pulled the dilute fiber slurry from the beaker and performed the measurements that include length weighted fiber length. Once the beaker was empty, "Results" was selected to see these measurements and record the length weighted fiber length.

Basis Weight

The basis weights for the molded fiber products were reported in g/m$^2$. For most paper products, a die with the dimensions of 0.10 m×0.10 m was used to obtain three samples. The mass of each 0.01 m$^2$ sample was measured on a balance to the nearest thousandth of a gram and multiplied by 100 to generate the basis weight. An average basis weight of the three samples was recorded. This method was utilized for the molded fiber trays. The egg cartons failed to have flat surfaces that met the size needs for this method. For surfaces measuring less than 0.10 m×0.10 m, a smaller die, measuring 0.025 m×0.025 m, was utilized to obtain three samples from the flat surfaces of the molded fiber item in question. These values were averaged and the average mass was multiplied by 1600 to yield units of g/m$^2$.

Burst Resistance Strength

Burst resistance strength measurements were obtained using a RegMed BT-21 Burst Strength Tester (available from Thwing-Albert, West Berlin, N.J.). Pieces of each molded fiber item were cut large enough to fully cover the surface area of the dome guard that comes down to cover the burst bubble during the test. Each molded fiber item was tested three times and the burst values, recorded in "psi", were averaged and reported. The burst strength values can be divided by the basis weight for each of the molded fiber products to generate a "strength to basis weight ratio", with the units psi/(g/m$^2$).

Whiteness Index and "l, a, b"

The whiteness index and values for "l", "a", and "b" were obtained utilizing a HunterLab UltraScan VIS (11491 Sunset Hills Rd, Reston, Va. 20190) attached to a computer and driven by the Easy Match QC software. The whiteness index reported was Whiteness Index E313 [D65/10]. The "l" represents the lightness axis, where a value of "zero" is black and a value of "100" is white. The "a" represents the red-green axis where positive values are red, negative values are green, and "zero" is neutral. The "b" represents the blue-yellow axis where positive values are yellow, negative values are blue, and "zero" is neutral. The UltraScan VIS was standardized pursuant to the instrument operating guidelines by establishing parameters with a light trap first and then an instrument standard white tile before obtaining whiteness values. A standard of typing paper, with a listed brightness value of 92, was used to compare the samples for reporting.

The following Examples illustrate aspects and advantages of exemplary embodiments of the invention.

Example No. 1

A molded fiber food tray with a weight of 510 grams per square meter, a burst resistance strength of 137 psi, and a whiteness index of 19.20 was produced using a thermoforming pulp molding machine, TPM-1500, from the Taiwan Pulp Molding Co. (No. 8, Te-Hsing 1st Rd., Su Ao, I-land 270, Taiwan. Tel 886-3-9908981). The tray had an "l" value of 89.15, an "a" value of 0.77, and a "b" value of 11.57. The fiber source for the tray was 75% short fiber, and 25% long fiber. The short fiber was collected from a DAF waste water stream from a paper machine operated by First Quality Tissue (441 Masters Boulevard, Anderson, S.C. 29626) at their Anderson, S.C. facility. The DAF rejects came from a paper machine producing paper towel using a through-air dried process. The long fiber was re-pulped reject towel paper produced on this same paper machine.

The mixture of 75% short fiber and 25% long fiber was diluted to 0.5% consistency prior to molding. A sample was taken and tested for BOD using EPA 405.1, SM5210B Test Method with a result of 1407 mg/L BOD. The filtrate, or water removed during the molding process was tested for BOD using the same test method with a result of 45.4 mg/L BOD. This process achieved over a 95% reduction in BOD.

Example No. 2

An egg carton with a weigh of 473 grams per square meter, a burst resistance strength of 108 psi, and a whiteness index of 37 was produced using a thermoforming pulp molding machine, TPM-1500, from the Taiwan Pulp Molding Co. (No. 8, Te-Hsing 1st Rd., Su Ao, I-land 270, Taiwan. Tel 886-3-9908981). The carton had an "l" value of 91.87, an "a" value of 0.09, and a "b" value of 9.30. The fiber source for the tray was 75% short fiber, and 25% long fiber. The short fiber was collected from DAF waste water stream from a paper machine operated by First Quality Tissue (441 Masters Boulevard, Anderson, S.C. 29626) at their Anderson, S.C. facility. The DAF rejects came from a paper machine producing paper towel using a through-air dried process. The long fiber was virgin northern bleached softwood kraft wood pulp.

The mixture of 75% short fiber and 25% long fiber was diluted to 0.5% consistency prior to molding. A sample was taken and tested for BOD using EPA 405.1, SM5210B Test Method with a result of 1450 mg/L BOD. The filtrate, or water removed during the molding process was tested for BOD using the same test method with a result of 42.4 mg/L BOD. This process achieved over a 95% reduction in BOD.

The burst strength of the egg carton produced in Example No. 2 was superior to all tested competitor cartons as shown below in Table 1.

TABLE 1

| Brand | Burst Strength (psi) | Material |
|---|---|---|
| Sunny Meadow | 27 | Polystyrene |
| Publix | 35 | Polystyrene |
| Laura Lynn | 44 | Molded Fiber |
| Goldhen | 43 | Molded Fiber |
| Harris Teeter | 60 | Polystyrene |
| Farmers Market | 49 | Molded Fiber |
| Great Day Farmers Market (CCF) | 26 | Polystyrene |

Now that the preferred embodiments of the present invention have been shown and described in detail, various modifications and improvements thereon will become readily apparent to those skilled in the art. Accordingly, the spirit and scope of the present invention is to be construed broadly and not limited by the foregoing specification.

The invention claimed is:

1. A molded pulp product, comprising:
   short fibers at a first fiber consistency, the short fibers being rejected short fibers from a paper-making process as obtained from waste water of the paper-making process; and
   long fibers having a length that is greater than a length of the short fibers, the long fibers obtained from water containing long fibers of the paper-making process that is separately collected from the waste water from which the short fibers are obtained, all of the long fibers in the molded pulp product being virgin pulp long fibers,
   the molded pulp product being formed from a pulp slurry obtained by blending the waste water containing short fibers and the water containing long fibers,
   the molded pulp product having a burst strength of greater than 100 psi,
   the short fibers make up 75% or greater of an entire amount of fibers in the molded pulp product,
   the molded pulp product has a basis weight of 473 to 510 gsm, and
   the molded pulp product complies with FDA standards 176.170 and 176.180.

2. The molded pulp product of claim 1, wherein the waste water containing short fibers has a fiber consistency in the range between 1.0% and 5.0%.

3. The molded pulp product of claim 1, wherein the long fibers have a length greater than 1.5 mm Lw as measured using a Fiber Quality Analyzer.

4. The molded pulp product of claim 1, wherein the pulp slurry comprises at least one of sizing control agents, strength control agents, microbe control agents, brightness control agents or whiteness control agents.

5. The molded pulp product of claim 1, wherein fiber consistency of the pulp slurry is within a range of 0.5% to 0.3%.

6. The molded pulp product of claim 5, wherein the fiber consistency is controlled using dilution water.

7. The molded pulp product of claim 6, wherein the dilution water is waste water of the papermaking process that is separately collected from the waste water from which the short fibers are obtained and the water from the which the long fibers are obtained.

8. The molded pulp product of claim 6, wherein the dilution water is fresh water that is separately collected from the waste water from which the short fibers are obtained and the water from the which the long fibers are obtained.

9. The molded pulp product of claim 6, wherein the dilution water contains fibers at a second fiber consistency that is lower than the first fiber consistency.

10. The molded pulp product of claim 1, wherein the waste water containing short fibers is sourced from one or more save-alls of a paper-making machine used in the papermaking process.

11. The molded pulp product of claim 10, wherein the one or more save-alls comprise at least one of a dissolved air flotation system, a disc filter or a clarifier.

12. The molded pulp product of claim 1, wherein the short fibers have a length that is less than 1.0 mm Lw as measured using a Fiber Quality Analyzer.

13. The molded pulp product of claim 1, wherein the virgin pulp long fibers comprise fibers selected from the group consisting of: softwood, kenaf, elephant grass, esparto grass, sisal, abaca, jute, hemp, cotton linters, and combinations thereof.

14. The molded pulp product of claim 1, wherein the long fibers are repulped paper mill waste fibers.

15. The molded pulp product of claim 1, wherein the molded pulp product is a tray, an egg carton, a plate, a cup, a bowl, a take-home box, or packaging.

16. The molded pulp product of claim 15, wherein the molded pulp product is an egg carton.

17. A molded pulp product, comprising:
   short fibers at a first fiber consistency, the short fibers being rejected short fibers from a paper-making process as obtained from waste water of the paper-making process; and
   long fibers having a length that is greater than a length of the short fibers, the long fibers obtained from water containing long fibers of the paper-making process that is separately collected from the waste water from which the short fibers are obtained, all of the long fibers in the molded pulp product being virgin pulp long fibers,
   the molded pulp product being formed from a pulp slurry obtained by blending the waste water containing short fibers and the water containing long fibers,
   the molded pulp product having a burst strength of greater than 100 psi,
   the short fibers make up 75% or greater of an entire amount of fibers in the molded pulp product, and
   the molded pulp product has a basis weight of 473 to 510 gsm.

18. A molded pulp product, comprising:
   short fibers at a first fiber consistency, the short fibers being rejected short fibers from a paper-making process as obtained from waste water of the paper-making process; and
   long fibers having a length that is greater than a length of the short fibers, the long fibers obtained from water containing long fibers of the paper-making process that is separately collected from the waste water from which the short fibers are obtained, all of the long fibers in the molded pulp product being virgin pulp long fibers,
   the molded pulp product being formed from a pulp slurry obtained by blending the waste water containing short fibers and the water containing long fibers,
   the molded pulp product having a burst strength of greater than 100 psi,
   the short fibers make up 75% or greater of an entire amount of fibers in the molded pulp product, and
   the molded pulp product complies with FDA standards 176.170 and 176.180.

* * * * *